(12) United States Patent
Gudmundsson et al.

(10) Patent No.: US 6,596,433 B2
(45) Date of Patent: Jul. 22, 2003

(54) METHOD AND DEVICE RELATING TO BATTERY TEMPERATURE REGULATION

(75) Inventors: Björn Gudmund Gudmundsson, Sollentuna (SE); Jan-Olof Tage Hammarling, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 220 days.

(21) Appl. No.: 09/782,225

(22) Filed: Feb. 14, 2001

(65) Prior Publication Data

US 2001/0033961 A1 Oct. 25, 2001

(30) Foreign Application Priority Data

Feb. 15, 2000 (SE) ................................. 0000481

(51) Int. Cl.⁷ .............................................. H01M 10/50
(52) U.S. Cl. ............................ 429/62; 429/50; 429/120
(58) Field of Search ............................ 429/50, 62, 120

(56) References Cited

U.S. PATENT DOCUMENTS 3,110,633 A    11/1963   Bachmann
5,343,368 A    8/1994    Miller

FOREIGN PATENT DOCUMENTS

EP    0 588 004 A1    3/1994
GB    2289976 A       12/1995

*Primary Examiner*—Randy Gulakowski
*Assistant Examiner*—Jonathan Crepean

(57) ABSTRACT

The present invention pertains to the field of methods and devices for battery (9) temperature regulation. Phase change material (7;7a,7b) having a phase change temperature within a preferred operating temperature range is employed in order to maintain the battery temperature within the preferred operating temperature range during extreme ambient temperature conditions. When the temperature of an ambient medium (21) so allows, a transfer of heat between the phase change material (7;7a,7b) and ambient medium (21) is effected for quickly restoring the capability of the phase change material (7;7a,7b) to maintain the battery temperature at the phase change temperature. Otherwise, thermal insulation between the phase change material (7;7a,7b) and the ambient medium (21) is provided.

20 Claims, 2 Drawing Sheets

METHOD AND DEVICE RELATING TO BATTERY TEMPERATURE REGULATION

This application claims priority under 35 U.S.C. §§119 and/or 365 to 0000481-2 filed in Sweden on Feb. 15, 2000; the entire content of which is hereby incorporated by reference.

1. Technical Field of the Invention

The present invention pertains to the field of methods and devices relating to battery temperature regulation, and more particularly to the part of this field concerned with temperature regulation of batteries having a preferred operating temperature range.

2. Background and Related Art

Many devices include one or more batteries for use in the operation of the devices. For example, it is common for portable devices to include one or more batteries as a supply of power. Furthermore, it is not uncommon for fixed devices to include one or more batteries as a backup in case of a power failure of an external power supply.

A lifetime of a battery often depends strongly on the temperature of the battery. In most batteries there is an electrolytic process in a liquid solution. If the temperature of the battery is above a preferred operating temperature range associated with the battery, the liquid will quickly dry out and electrodes of the battery will be damaged or worn out. Peaks in the temperature of the battery, even of relatively short durations, can therefore shorten the operating lifetime of the battery immensely. If, instead, the battery temperature is below the preferred operating temperature range, a performance of a galvanic process in the battery is degraded, thereby causing a decrease in voltage and charge of the battery. Consequently, the battery will have to be recharged more often, resulting in a reduction of a lifetime of the electrodes of the battery.

For example, if a lead battery is subjected to peak temperatures over 35° C., the lifetime of the battery will be reduced with as much as 30–50%. Similarly, the useful lifetime of the lead battery will to some extent be reduced, should the battery be subjected to temperatures below 0° C.

If, due to temperature extremes, the lifetime of the battery is reduced, this will result in increased costs, including costs for a replacement battery as well as working costs for changing the batteries. It is, therefore, desirable to maintain the temperature of the battery within the preferred operating temperature range at all times, in order to obtain an increased lifetime of the battery.

Today it is common to regulate the temperature of batteries using Air Conditioning Units (ACU). However, a drawback is that the ACUs are fairly complicated and expensive.

In U.S. Pat. No. 5,343,368 is disclosed a portable device having a passive mechanism for regulating the temperature of a battery associated with the portable device. The battery is surrounded by a blanket, which is in thermal communication with the battery and which contains a phase change material (PCM)—i.e. a material that changes from one state to another maintaining an essentially constant phase change temperature. The phase change material has a phase change temperature corresponding to an optimal operating temperature of the battery. When the portable device is received in an associated recharging stand, the phase change material will either be cooled or heated, depending on ambient temperature conditions. If an ambient temperature is above the optimal operating temperature, the phase change material will be refrigerated to a temperature below the phase change temperature (solid state). If, instead, the ambient temperature is below the optimal operating temperature, the phase change material will be heated to a temperature above the phase change temperature (liquid state). Consequently, the phase change material will serve to maintain the temperature of the battery at essentially the optimal operating temperature until all of the phase change material has changed phase from solid to liquid or from liquid to solid, whichever applies. However, once all of the phase change material has undergone a change of phase, the temperature of the battery will no longer be maintained at the optimal operating temperature. Furthermore, if there is a sudden change in the ambient temperature, for example from very hot to very cold, the phase change material will completely fail to maintain the battery at its optimal operating temperature.

SUMMARY OF THE INVENTION

The present invention addresses mainly the problem of obtaining methods and devices for temperature regulation of one or more batteries having preferred operating temperature ranges.

The problem is solved in short according to the following. Phase change material having a phase change temperature within the preferred operating temperature range is employed in order to maintain the battery temperature within the preferred operating temperature range during extreme ambient temperature conditions. When the ambient temperature so allows, a transfer of heat between the phase change material and ambient medium is effected for quickly restoring the capability of the phase change material to maintain the battery temperature at the phase change temperature.

A main object of the present invention is to regulate the temperature of one or more batteries, and the invention includes methods as well as devices for accomplishing this object.

The above-stated problem is solved in more detail according to the following.

For preventing the battery temperature from exceeding the preferred operating temperature range, it is preferred that the phase change temperature is in an upper portion of the preferred operating temperature range. The phase change material is thermally insulated from the ambient medium when the ambient temperature is above the phase change temperature. When, instead, the ambient temperature is in a selected range below the phase change temperature, a transfer of heat from the phase change material to the ambient medium is provided.

For preventing the battery temperature from falling below the preferred operating temperature range, a phase change material is used having, preferably, a phase change temperature in a lower portion of the preferred operating temperature range. The phase change material is thermally insulated from the ambient medium when the ambient temperature is below the phase change temperature. When, instead, the ambient temperature is in a selected range above the phase change temperature, a transfer of heat from the ambient medium to the phase change material is provided.

The invention has several advantages. The invention provides temperature regulation that greatly extends the lifetime of batteries, thereby considerably reducing costs. The temperature regulation provided according to the invention is also fairly simple and cheap. Furthermore, the invention uses the ambient medium in a very efficient way. When the ambient temperature so allows, the ambient medium is used to quickly return the phase change material to a temperature state which allows the phase change material to be used for maintaining the battery temperature essentially at the phase change temperature.

The invention will now be described further using preferred embodiments and referring to the drawings.

PREFERRED EMBODIMENTS

Figure 1:
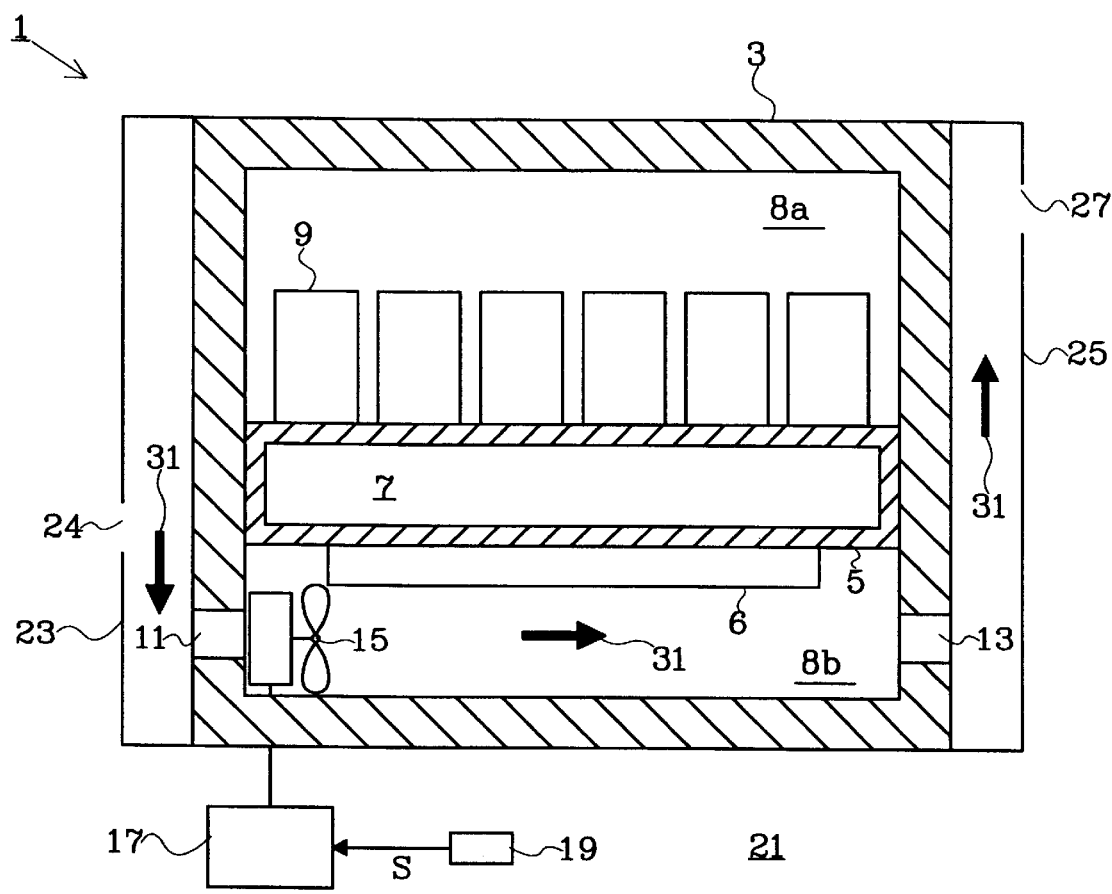
FIG. 1 is a cross-sectional view of a first device for regulating a temperature of a number of batteries.

FIG. 1 is a cross-sectional view of a first device 1 for regulating a temperature of a number of batteries 9. The first device 1 includes a thermally insulating cabinet 3, which defines a space in which a container 5 is arranged. The container 5 is a good thermal conductor and contains a phase change material 7. The container 5, which is relatively flat, is arranged so that it divides the space in the cabinet 3 into a first (upper) section 8a and a second (lower) section 8b, the first and the second sections 8a and 8b being completely sealed off from each other. The batteries 9 are arranged in the first section 8a and are in thermal communication with the container 5 and the phase change material 7 therein. In this example the batteries 9 are arranged in upright positions on top of the container 5. A battery fluid in the batteries 9 is therefore at the bottom of the batteries 9 (i.e. close to the container 5), and this will provide an excellent thermal communication between the batteries 9 and the container 5 with the phase change material 7. The cabinet 3 includes an inlet 11 leading into the second section 8b and an outlet 13 leading out of the second section 8b. A fan 15 is arranged in the second section 8b of the cabinet 3. The fan 15 is connected to a control circuit 17, which is arranged for controlling the operation of the fan 15. In FIG. 1, the control circuit is, for reasons of clarity, arranged outside the cabinet 3. However, in practice, the control circuit 17 is preferably arranged inside the cabinet 3, e.g. in the first section 8a. The control circuit 15 is also connected to a temperature sensor 19, which is arranged outside the cabinet 3 for measuring a temperature of an ambient medium 21 (e.g. ambient air) and for generating a sensor signal S indicating the measured ambient temperature. The control circuit 17 is arranged for receiving the sensor signal S.

During charging or discharging, the batteries 9 will generate heat. Furthermore, since the cabinet 3 is not an infinitely good insulator, the batteries 9 will also receive some heat from the ambient medium 21 when the ambient temperature is above the temperature of the batteries 9. This may cause the temperature of the batteries 9 to rise. The temperature of the batteries 9 is, however, to be maintained within a preferred operating temperature range. During periods of peak ambient temperature, the temperature of the batteries 9 may reach a phase change temperature of the phase change material 7. The phase change material 7 will then undergo a phase change from a lower temperature state (e.g. solid) to a higher temperature state (e.g. liquid) at the constant phase change temperature. The phase change process absorbs heat from the batteries 9, thereby maintaining the temperature of the batteries 9 essentially at the phase change temperature. The phase change material 7 is preferably selected so that the phase change temperature is in the upper portion of the preferred operating temperature range of the batteries 9.

The control circuit 17 is arranged for controlling the operation of the fan 15 in dependence of the ambient temperature as indicated by the sensor signal S. When the ambient temperature is above the phase change temperature, the control circuit 17 is arranged for turning off the fan 15. The temperature of the batteries 9 will then be regulated solely by the phase change in the phase change material 7. The cabinet 3 is arranged for providing thermal insulation between the container 5 with the phase change material 7 and the ambient medium 21 surrounding the first device 1. The phase change material 7 will therefore absorb heat almost exclusively from the batteries 9, thereby extending a maximum time for which the phase change material 7 is able to maintain the temperature of the batteries 9 at the phase change temperature.

When the ambient temperature is below the phase change temperature, the control circuit 17 is arranged for starting the fan 15. The fan 15 causes a stream of ambient medium 31 to pass through the second section 8b of the cabinet 3. The stream of ambient medium 31 enters the second section 8b via the inlet 11, which in turn is connected to an inlet chimney 23 having an opening 24 for receiving the stream of ambient medium 31. The stream of ambient medium 31 exits the second section 8b of the cabinet 3 via the outlet 13, which in turn is connected to an outlet chimney 25 having an opening 27 trough which the stream of ambient medium 31 is exhausted. Since the stream of ambient medium 31, when passing through the second section 8b of the cabinet 3, has a temperature which is lower than the phase change temperature, the stream of ambient medium 31 will receive heat from the container 5 and the phase change material 7. The container 5 includes fins 6 protruding into the second section 8b. The fins 6 serve to increase a heat transfer area of the container 5. The heat received by the stream of ambient medium 31 is delivered by convection, via the outlet chimney 25, to the ambient medium 21 surrounding the first device 1. The heat accumulated by the phase change material 7 during peaks in the ambient temperature will quickly be transferred away from the phase change material 7, thereby returning the phase change material 7 to its lower temperature state. Consequently, the ability of the phase change material 7 to absorb heat from the batteries 9 will quickly be restored to its full capacity as soon as the ambient temperature allows for an efficient transfer of heat from the phase change material 7 to the ambient medium 21.

Since the first section 8a of the cabinet 3 is sealed off from the second section 8b, the batteries 9 will be protected from the ambient medium 21 at all times.

As have been explained, also low temperatures may be harmful to the batteries 9 and may cause the lifetime of the batteries 9 to be shortened. With minor modifications, the first device 1 is used also to prevent the temperature of the batteries 9 from becoming undesirably low. The phase change material 7 is then preferably selected so that the phase change temperature is in a lower portion of the preferred operating temperature range of the batteries 9. The control circuit 17 is arranged for turning off the fan 15 responsive to the ambient temperature being below the phase change temperature, thereby providing thermal insulation between the container 5 with the phase change material 7 and the ambient medium 21 which surrounds the first device 1. A phase change in the phase change material 7 from a higher temperature state (e.g. liquid) to a lower temperature state (e.g. solid) will deliver heat to the batteries 9, thereby maintaining the temperature of the batteries 9 at essentially the phase change temperature. Since the phase change material 7 is thermally insulated from the ambient medium 21, the phase change material will deliver heat almost exclusively to the batteries 9 and not to the ambient medium 21 surrounding the device 1. The control circuit 17 is arranged for turning on the fan 15 responsive to the ambient temperature being above the phase change temperature. This will cause the stream of ambient medium 31 to flow through the second section 8b of the cabinet 3. Since the stream of ambient medium 31 in this case has a temperature which is higher than the phase change temperature, the stream of ambient medium will deliver heat to the container 5 and the phase change material 7. Consequently, the phase change material 7 will be returned to its higher temperature state, thereby quickly restoring to its full capacity the capability of the phase change material 7 to deliver heat to the batteries 9.

Figure 2:
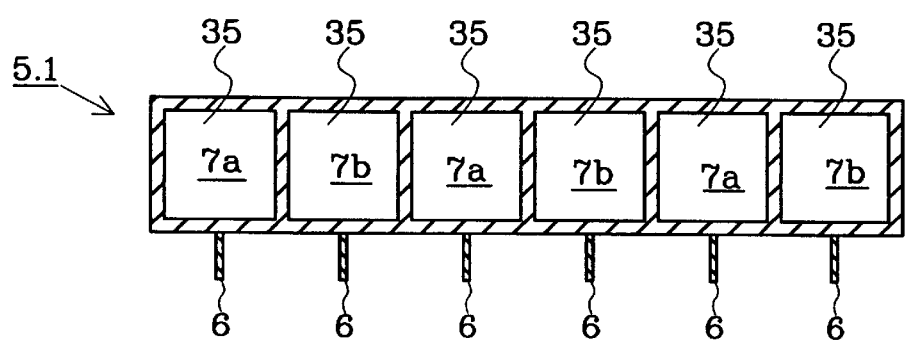
FIG. 2 is a cross-sectional view of a container having compartments for carrying two different phase change materials.

If the ambient temperature exhibits large variations, it is desirable to provide that the batteries 9 are neither too hot nor too cold. Therefore, the first device 1 may alternatively include more than one phase change material. In FIG. 2 is shown a cross-sectional view of an alternative container 5.1, which is arranged for containing both a first phase change material 7a and a second phase change material 7b. The first phase change material 7a has a first phase change temperature, preferably in the lower portion of the preferred operating temperature range of the batteries 9. The second phase change material 7b has a second phase change temperature, preferably in the upper portion to the preferred operating temperature range of the batteries 9. The alternative container 5.1 includes a predetermined number (in this example six) of elongated compartments 35. The compartments 35 are sealed off from each other, and each compartment 35 contains one or the other of the first phase change material 7a or the second phase change material 7b. The alternative container 5.1 includes, in similar manner as the container 5, fins 6 in order to increase a heat transfer area of the alternative container 5.1. When the first device 1 is arranged to include the alternative container 5.1 instead of the container 5, the control circuit 17 is arranged for turning off the fan 15 when the ambient temperature is below the first phase change temperature or above the second phase change temperature. Furthermore, the control circuit 17 is arranged for turning on the fan 15 when the ambient temperature is above the first phase change temperature but below the second phase change temperature. The first phase change material 7a will consequently serve to prevent the temperature of the batteries 9 to fall below the preferred operating temperature range. In a similar manner, the second phase change material 7b will serve to prevent the temperature of the batteries 9 from rising above the preferred operating temperature range.

Alternatively, the first device 1 includes also shutters, which are controlled by the control circuit 17. The shutters are arranged adjacent to the openings 24 and 27. The control circuit 17 is arranged for controlling the shutters so as to close the openings 24 and 27 using the shutters when the phase change material(s) 7 (7a and 7b) is (are) to be thermally insulated from the ambient medium 21. This will prevent ambient medium 21 from passing through the openings 24 or 27, thereby further increasing the thermal insulation between the phase change material(s) 7 (7a and 7b) and the ambient medium 21 surrounding the first device 1. Otherwise, the control circuit 17 is arranged for controlling the shutters so as to leave the openings 24 and 27 open for a passage of ambient medium 21. Alternatively, the shutters are instead arranged adjacent to the inlet 11 and the outlet 13, thereby allowing for the inlet 11 and the outlet 13 to be closed in order to improve the thermal insulation between the phase change material(s) 7 (7a and 7b) and the ambient medium 21.

Figure 3:
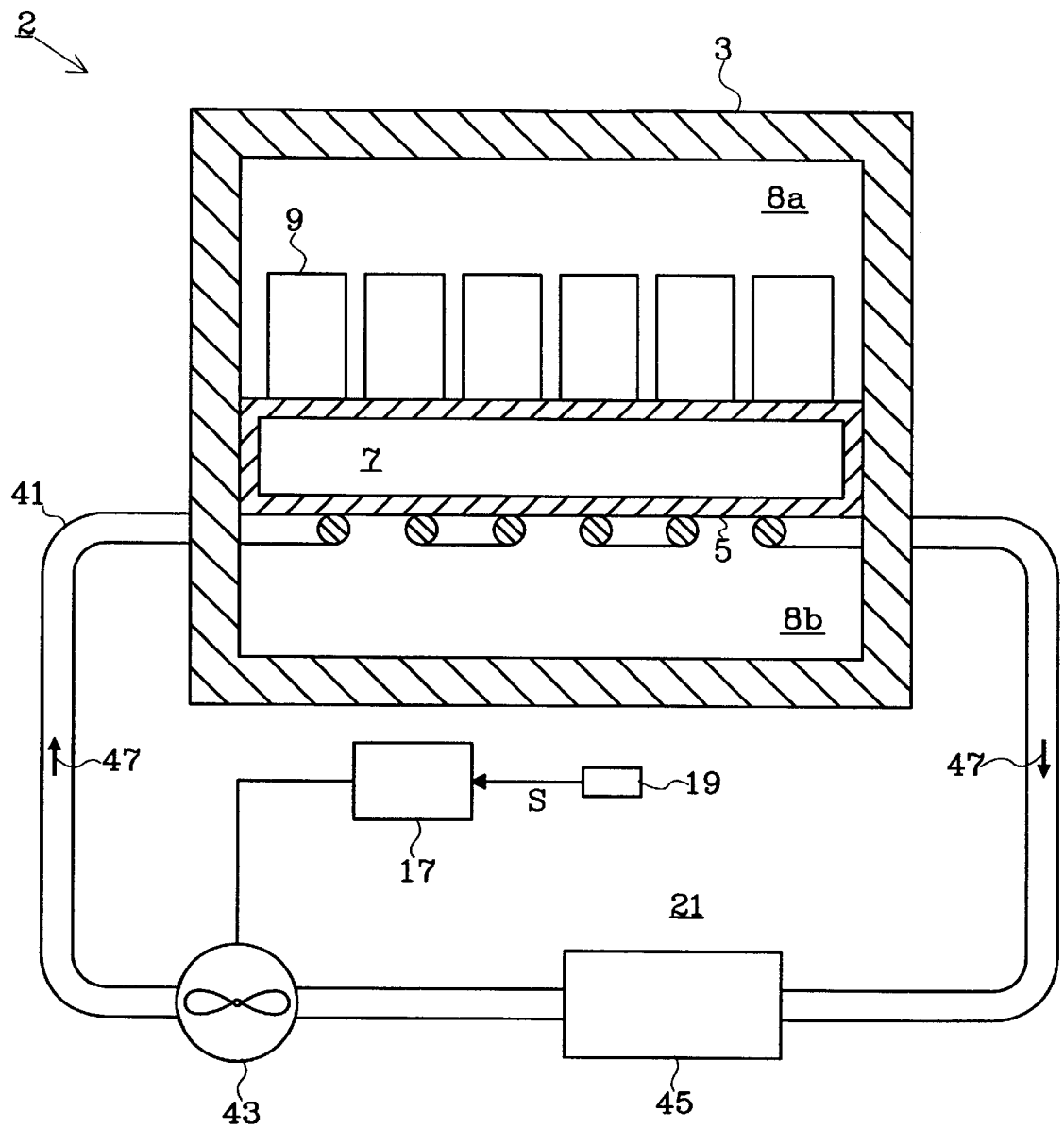
FIG. 3 is a cross-sectional view of a second device for regulating the temperature of a number of batteries.

FIG. 3 shows a cross-sectional view of a second device 2 for regulating the temperature of the batteries 9. The second device 2 includes several features that correspond to features of the first device 1. Those features of the second device 2 that correspond to features of the first device 1 are, for the sake of simplicity, referred to by the same reference numerals as the corresponding features of the first device 1. The second device 2 includes a piping system 41, which carries a fluid, e.g. water or another liquid having suitable heat transfer properties. A portion of the piping system 41 passes the second section 8b of the cabinet 3. This portion of the piping system 41 is arranged in a zigzag manner on a downside of the container 5. The piping system 41 also passes through a heat exchanger 45, which is arranged outside the cabinet 3 and which has a relatively large heat transfer surface in contact with the ambient medium 21 surrounding the second device 2. A pump 43 is connected to the piping system 41. The control circuit 17 is connected to the pump 43 for controlling the operation of the pump 43 in dependence of the ambient temperature as indicated by the sensor signal S from the temperature sensor 19. When the pump 43 is turned off, the container 5 and the phase change material 7 are thermally insulated from the ambient medium 21. When the pump 43 is running, a circulating fluid flow 47 will be established in the piping system 41. If the ambient temperature is below the phase change temperature, the fluid flow 47 will receive heat from the container 5 and the phase change material 7 and deliver heat (via the heat exchanger) to the ambient medium 21. If, instead, the ambient temperature is above the phase change temperature, the fluid flow 47 will receive heat (via the heat exchanger) from the ambient medium 21 and deliver heat to the container 5 and the phase change material 7. The control circuit 19 is arranged for controlling the pump 43 in the second device 2 in dependence of the ambient temperature in a similar manner as the control circuit 17 is controlling the fan 15 in the first device 1. Consequently, the temperature of the batteries 9 in the second device 2 is regulated in a similar manner as in the first device 1.

The second device 2 is used with one phase change material for preventing the temperature of the batteries 9 rising above the preferred operating temperature range or for preventing the temperature of the batteries 9 from falling below the preferred operating temperature range. Alternatively, however, the second device 2 is used with two phase change materials—as explained above when discussing the first device 1—and, preferably, including the alternative container 5.1 of FIG. 2.

The invention includes also methods, by which the devices 1 and 2 are arranged for operating when providing battery temperature regulation, the methods including method steps for carrying out the temperature regulation, said method steps being readily apparent to a skilled person from the above.

The invention can be used for regulating the temperature of most forms of batteries (e.g. lead batteries, NiCd batteries et cetera), provided that the phase change material(s) is (are) selected properly having regard to the preferred operating temperature of the batteries in question.

For lead batteries, it is preferred that the temperature of the batteries does not exceed 35° C. and does not fall below 0° C. It being understood, however, that a skilled person may select the preferred operating temperature range more restrictively, depending on the circumstances. For a phase change material, which is used to prevent the temperature of the lead batteries to rise above the preferred operating temperature range, the phase change temperature is preferably between 30° C. and 35° C. For example, glauber's salt (i.e. sodium sulphate ($Na_2SO_4$) including ten crystal water molecules per sodium sulphate molecule), which has a phase change temperature of 32° C., may be used for this purpose. For a phase change material, which is to be used in order to prevent the temperature of the lead batteries from falling below the preferred operating temperature range, the phase change temperature is preferably between 0° C. and 10° C. For example, a mixture of mainly sodium sulphate together with suitable additives, with a phase change temperature of about 5° C., may be used for this purpose.

The invention is advantageously used in outdoor systems where the ambient temperature varies on a 24-hour basis. The amount(s) of phase change material(s) is (are) preferably selected having regard to the heat generation in the batteries 9 and a probability distribution of durations of periods when the ambient temperature is above (or below) the relevant phase change temperature. For example, the amount(s) of phase change material(s) may be selected so that there is predetermined probability that the temperature of the batteries 9 is maintained within the preferred operating temperature range during periods of extreme ambient temperature conditions.

What is claimed is:

1. A method for regulating a temperature of a battery having a preferred operating temperature range, the method comprising:
   providing an amount of phase change material having a phase change temperature within the preferred operating temperature range, the amount of phase change material being in thermal communication with the battery, and a phase change in the amount of phase change material maintaining the temperature of the battery essentially at the phase change temperature; and
   influencing heat transfer with respect to the amount of phase change material in dependence of a temperature of an ambient medium, the method for influencing heat transfer including;
   providing thermal insulation between the amount of phase change material and the ambient medium responsive to the temperature of the ambient medium being above the phase change temperature; and
   providing a transfer of heat from the amount of phase change material to the ambient medium responsive to the temperature of the ambient medium being below the phase change temperature.

2. A method according to claim 1, wherein the providing of a transfer of heat includes producing a flow of heat transfer fluid which receives heat from the amount of phase change material and delivers heat to the ambient medium.

3. A method according to claim 2, wherein the heat transfer fluid includes parts of the ambient medium.

4. A method according to claim 1, wherein the phase change temperature is in upper portion of the preferred operating temperature range.

5. A method according to claim 1, wherein the method further comprises protecting the battery from the ambient medium.

6. A method for regulating a temperature of a battery having a preferred operating temperature range, the method comprising:
   providing an amount of a phase change material having a phase change temperature within the preferred operating temperature range, the amount of the phase change material being in thermal communication with the battery, and a phase change in the amount of phase change material maintaining the temperature of the battery essentially at the phase change temperature; and
   influencing heat transfer with respect to the amount of phase change material in dependence of a temperature of an ambient medium, the method for Influencing heat transfer including:
   providing thermal insulation between the amount of phase change material and the ambient medium responsive to the temperature of the ambient medium being below the phase change temperature; and
   providing a transfer of heat from the ambient medium to the amount of phase change material responsive to the temperature of the ambient medium being above the phase change temperature.

7. A method according to claim 6, wherein the providing of a transfer of heat includes producing a flow of heat transfer fluid which receives heat from the ambient medium and delivers heat to the amount of the phase change material.

8. A method according to claim 7, wherein the heat transfer fluid includes parts of the ambient medium.

9. A method according to claim 6, wherein the phase change temperature is in a lower portion of the preferred operating temperature range.

10. A method according to claim 6, wherein the method further comprises protecting the battery from the ambient medium.

11. A device for regulating the temperature of at least one battery having a preferred operating temperature range, the device comprising:
    a region for receiving at least one battery;
    an amount of a phase change material having a phase change temperature within the preferred operating temperature range, the amount of phase change material being in thermal communication with the region, and a phase change in the amount of the phase change material maintaining the temperature of the region essentially at the phase change temperature; and
    means for influencing heat transfer with respect to the amount of phase change material in dependence of a temperature of an ambient medium, the means for influencing heat transfer includes:
    means for providing thermal insulation between the amount of phase change material and the ambient medium responsive to the temperature of the ambient medium being above the phase change temperature; and
    means for providing a transfer of heat from the amount of phase change material to the ambient medium responsive to the temperature of the ambient medium being below the phase change temperature.

12. A device according to claim 11, wherein the means for providing the transfer of the heat includes means for producing a flow of a heat transfer fluid which receives heat from the amount of phase change material and delivers heat to the ambient medium.

13. A device according to claim 12, wherein the heat transfer fluid includes parts of the ambient medium.

14. A device according to claim 11, wherein the phase change temperature is in a upper portion of the preferred operating temperature range.

15. A device according to claim 11, wherein the device further comprises means for protecting the region from the ambient medium.

16. A device for regulating the temperature of at least one battery having a preferred operating temperature range, the device comprising:

a region for receiving at least one battery;

an amount of a phase change material having a phase change temperature within the preferred operating temperature range, the amount of phase change material being in thermal communication with the region, and a phase change in the amount of the phase change material maintaining the temperature of the region essentially at the phase change temperature; and means for influencing heat transfer with respect to the amount of phase change material in dependence of a temperature of an ambient medium, the means for influencing heat transfer includes:

means for providing thermal insulation between the amount of phase change material and the ambient medium responsive to the temperature of the ambient medium being below the phase change temperature; and means for providing a transfer of heat from the ambient medium to the amount of phase change material responsive to the temperature of the ambient medium being above the phase change temperature.

17. A device according to claim 16, wherein the means for providing the transfer of heat includes means for producing a flow of heat transfer fluid which receives heat from the ambient medium and delivers heat to the amount of phase change material.

18. A device according to claim 17, wherein the heat transfer fluid includes parts of the ambient medium.

19. A device according to claim 16, wherein the phase change temperature is in a lower portion of the preferred operating temperature range.

20. A device according to claim 16, wherein the device further comprises means for protecting the region from the ambient medium.

* * * * *